(12) United States Patent
Kato et al.

(10) Patent No.: US 9,394,953 B2
(45) Date of Patent: Jul. 19, 2016

(54) BRAKE LINING FOR RAILWAY VEHICLES AND DISC BRAKE EQUIPPED WITH THE SAME

(75) Inventors: Takanori Kato, Tokyo (JP); Takahiro Fujimoto, Tokyo (JP); Kazutaka Asabe, Tokyo (JP); Atsushi Sakaguchi, Tokyo (JP); Yasushi Karino, Fussa (JP); Shin-ichi Saga, Kokubunji (JP); Takashi Maejima, Kyoto (JP); Satoru Nakano, Kyoto (JP); Takeshi Nakano, Kyoto (JP)

(73) Assignees: NIPPON STEEL & SUMITOMO METAL CORPORATION, Tokyo (JP); RAILWAY TECHNICAL RESEARCH INSTITUTE, Tokyo (JP); FINE SINTER CO., LTD., Aichi (JP)

( * ) Notice: Subject to any disclaimer, the term of this patent is extended or adjusted under 35 U.S.C. 154(b) by 0 days.

(21) Appl. No.: 14/123,260

(22) PCT Filed: May 31, 2012

(86) PCT No.: PCT/JP2012/003568
§ 371 (c)(1),
(2), (4) Date: Dec. 2, 2013

(87) PCT Pub. No.: WO2012/164935
PCT Pub. Date: Dec. 6, 2012

(65) Prior Publication Data
US 2014/0097049 A1    Apr. 10, 2014

(30) Foreign Application Priority Data

Jun. 2, 2011  (JP) .................................. 2011-124145

(51) Int. Cl.
*F16D 65/092* (2006.01)
*F16D 55/22* (2006.01)
*B61H 5/00* (2006.01)

(52) U.S. Cl.
CPC *F16D 55/22* (2013.01); *B61H 5/00* (2013.01); *F16D 65/092* (2013.01)

(58) Field of Classification Search
CPC ................. F16D 2069/0433; F16D 2069/0408
USPC ................................ 188/250 g, 250 b, 250 e
See application file for complete search history.

(56) References Cited

U.S. PATENT DOCUMENTS 2,129,372 A  *  9/1938  Gamble ..................... 192/107 C
2,986,252 A  *  5/1961  Du Bois ................... 192/107 M
(Continued)

FOREIGN PATENT DOCUMENTS

| CN | 1804422 | 7/2006 |
|---|---|---|
| DE | 298 21 113 | 2/1999 |

(Continued)

*Primary Examiner* — Bradley King
(74) *Attorney, Agent, or Firm* — Clark & Brody

(57) ABSTRACT

A disc brake for railway vehicles includes a brake disc fixed to a wheel or an axle of a railway vehicle and a brake lining configured to be pressed against a frictional surface of the brake disc by a brake caliper. The brake lining includes a plurality of friction members arranged to be spaced from each other, each of the friction members having a surface that faces the frictional surface of the brake disc, a metallic backing secured to back surfaces of the friction members, and a base plate supporting the friction members on the back surface side via spring members. The base plate is mounted to a brake caliper; wherein the friction members are provided in pairs with each pair being formed by two adjacent ones of the friction members, and the metallic backing is a one-piece member provided for each pair of the friction members.

12 Claims, 2 Drawing Sheets

(56) References Cited

U.S. PATENT DOCUMENTS

| | | | |
|---|---|---|---|
| 3,297,117 A * | 1/1967 | Freholm | 188/234 |
| 3,809,200 A * | 5/1974 | Smales | 192/107 C |
| 5,135,094 A * | 8/1992 | de Briel et al. | 192/107 R |
| 5,538,108 A * | 7/1996 | Russo | 188/250 E |
| 5,934,418 A * | 8/1999 | Wirth | 188/73.1 |
| 6,478,125 B1 * | 11/2002 | Russo et al. | 188/250 E |
| 7,648,007 B2 * | 1/2010 | Russo et al. | 188/250 E |
| 7,661,515 B2 * | 2/2010 | Maehara | 188/250 G |
| 8,215,461 B2 * | 7/2012 | Holme et al. | 188/250 G |
| 8,544,617 B2 * | 10/2013 | De Soccio | 188/235 |
| 8,844,686 B2 * | 9/2014 | Muehlegger | 188/250 B |
| 2013/0105258 A1 * | 5/2013 | Sigl et al. | 188/251 R |

FOREIGN PATENT DOCUMENTS

| | | |
|---|---|---|
| JP | 46-34271 | 11/1971 |
| JP | 10-507250 | 7/1998 |
| JP | 2006-194429 | 7/2006 |
| JP | 2008-151188 | 7/2008 |
| WO | 02/073059 | 9/2002 |

* cited by examiner (a)

(b) A-A (a)

(b)

(c) B-B

BRAKE LINING FOR RAILWAY VEHICLES AND DISC BRAKE EQUIPPED WITH THE SAME

TECHNICAL FIELD

The present invention relates to a disc brake for use as a braking device for railway vehicles, and in particular to a brake lining for railway vehicles configured to be pressed against a frictional surface of a brake disc fixed to a wheel or an axle thereof and a disc brake equipped with the brake lining.

BACKGROUND ART

As a braking device for land transportation vehicles such as railway vehicles, automobiles, and motorcycles, disc brakes have been widely used in recent years as those vehicles have become increasingly faster and larger. A disc brake is a device that produces a braking force by means of friction generated by sliding contact between a brake disc and a brake lining.

In the case of railway vehicles, a braking force is generated by pressing a brake lining, by a brake caliper, against a frictional surface of a brake disc in the form of a donut-shaped disc which has been mounted and fixed to the wheel or the axle. In this manner, the rotation of the wheel or the axle is slowed or stopped so that the speed of the vehicle is controlled.

During the operation, deceleration of the vehicle depends on the braking force of the disc brake, and the braking force greatly depends on the coefficient of friction between the brake disc and the brake lining. In actual traveling, it is desired that deceleration of a vehicle under braking can be accurately controlled, and in order to achieve this, the coefficient of friction between the brake disc and the brake lining should desirably be stable and constant regardless of variations in the traveling speed at the time of start of the braking operation.

In addition, during the braking operation, the temperatures of the frictional surfaces of the brake lining and the brake disc that come into contact with each other increase due to frictional heat. The temperature increase tends to be noticeable under conditions where the braking load increases, specifically when the vehicle is travelling at high speed or the vehicle is heavy. In actual traveling, it is desired that thermal damage to the disc brake be prevented so that its durability is enhanced. In order to achieve this, it is necessary to provide as uniform contact as possible between the brake lining and the brake disc during the braking operation and reduce the generation of frictional heat.

FIG. 1 shows a conventional typical disc brake for railway vehicles. In the figure, FIG. 1(a) is a planar view of a brake lining, and FIG. 1(b) is an enlarged cross sectional view of FIG. 1(a) taken along line A-A. FIG. 1(a) shows the brake lining as seen from the brake disc side, which is the front side.

The conventional typical brake lining (hereinafter referred to as a "conventional brake lining") 102 shown in FIG. 1 includes: a plurality of wide plate-shaped friction members 103; metallic backings 104 secured to the back surfaces of the friction members 103; and a base plate 106 holding the friction members 103 together with the metallic backings 104 on the back surface side. The friction members 103, together with the metallic backings 104, are rigidly mounted to the base plate 106 by means of rivets (not shown). In the thus configured conventional brake lining 102, the base plate 106 is mounted to a brake caliper (not shown), so that the front surfaces of the friction members 103 face the frictional surface 101a of the brake disc 101.

The brake caliper is actuated by, for example, hydraulic or pneumatic pressure as a driving source during the braking operation, to press the brake lining 102 against the brake disc 101. During this operation, the pressing force applied from the brake caliper to the brake lining 102 does not act uniformly on the entire area of the brake lining 102, but acts on some particular regions in a concentrated manner due to the mounting structure of the two parts.

As a result of this, in the case of a disc brake including the conventional brake lining 102, the contact pressure between the brake disc 101 and the brake lining 102 locally increases during the braking operation because the friction members 103 have a fairly wide plate shape and are rigidly fixed to the base plate 106. Consequently, the temperature increase due to the friction during the braking operation becomes locally excessive, which results in an increase in wear of the brake lining 102 (friction members 103) and the brake disc 101 or the formation of cracks in the brake disc 101 at the location experiencing the excessive temperature increase. This thermal damage leads to the loss of durability of the disc brake.

To address this problem, a variety of brake linings with an improved structure have been proposed in recent years with the intention of providing uniform contact pressure between the brake lining and the brake disc during braking operation. For example, Patent Literatures 1 to 3 describe brake linings in each of which friction members are provided in such a manner that the friction member of the conventional brake lining is divided into smaller pieces and the plurality of divided pieces of friction members are arranged to be spaced from each other.

In the brake lining described in Patent Literature 1, the friction members are each separately provided with a metallic backing secured to the back surface thereof. The friction members together with the metallic backings are mounted, on the back surface side, via separately provided spring members, to a base plate by means of rivets, so that they are separately resiliently supported.

In the brake lining described in Patent Literature 2, the friction members are provided in pairs with each pair being formed by two adjacent ones of the friction members, and the paired friction members are together provided with a one-piece resilient leaf secured to the back surfaces thereof. Each resilient leaf is rigidly mounted to the base plate by means of two rivets at a portion corresponding to a gap between the friction members fixed to the resilient leaf. In this manner, the friction members are each separately resiliently supported at the two locations of the rivets between the friction members serving as supporting points.

In the brake lining described in Patent Literature 3, the friction members are provided in pairs with each pair being formed by two adjacent ones of the friction members, and the paired friction members are together provided with a one-piece metallic thin film secured to the back surfaces thereof. Each metallic thin film is attached to the base plate by means of two rivets via elastic elements at a portion corresponding to a gap between the friction members that are secured to the metallic thin film. In this manner, the friction members are each separately resiliently supported at the two locations of the rivets between the friction members serving as supporting points.

All the brake linings described in Patent Literatures 1 to 3 are expected to have uniform contact pressure with respect to the brake disc during the braking operation because their friction members are resiliently supported on the base plate.

However, the brake lining described in Patent Literature 1 is configured such that the friction members are each independently movable. Because of this, the coefficient of friction between the brake disc and the brake lining may vary depending on the traveling speed at the time of start of the braking operation. Such variability of the friction coefficient occurs in the brake linings described in Patent Literatures 2 and 3 as well. This is because the friction members in those literatures too are each independently movable because they are each resiliently supported via the resilient leaf or the metallic thin film at the location between the paired friction members serving as a supporting point.

If the coefficient of friction varies depending on the traveling speed at the time of start of the braking operation, accurate control of deceleration of the vehicle under braking becomes difficult, thus making it impossible to ensure the required braking performance. In particular, in the case of high speed railway vehicles such as a Shinkansen "bullet train", the variation in the coefficient of friction poses a problem because the traveling speed broadly ranges from low speed to high speed.

Furthermore, in the case of the brake lining described in Patent Literature 1, the friction members are each fastened to the base plate by a single rivet, and thus they are caused to rotate at their respective positions during the braking operation. If such rotation of the friction members is repeated as a result of repeated braking operations, loosening occurs at the fastening portion between the friction members and the base plate, which finally results in falling off of the friction members. Because of this, it is impossible to ensure sufficient durability and reliability.

CITATION LIST

Patent Literature

PATENT LITERATURE 1: Japanese Patent Application Publication No. 2008-151188
PATENT LITERATURE 2: International Publication No. WO2002/073059 pamphlet
PATENT LITERATURE 3: Japanese Patent Application Publication No. 2006-194429

SUMMARY OF INVENTION

Technical Problem

The present invention has been made in view of the foregoing problem, and has as its object to provide a brake lining and a disc brake for railway vehicles that can achieve uniform contact pressure between the brake lining and the brake disc during braking operation while at the same time achieving a stable coefficient of friction between them so that durability and reliability are enhanced.

Solution to Problem

In order to achieve the above object, the present inventors conducted a variety of tests and analyses and intensively studied, and consequently made the following findings (a) to (c).

(a) As stated above, in order to achieve uniform contact pressure between a brake lining and a brake disc during braking operation, it is necessary to provide a configuration in which a plurality of small friction members are each separately resiliently supported so that they are each individually movable. However, in order to achieve a stable coefficient of friction between the brake disc and the brake lining, the movement of each friction member must be constrained to some extent.

(b) The uniform contact pressure and stable coefficient of friction stated in the above (a) can be achieved both at the same time by providing a configuration in which: the friction members are provided in pairs with each pair being formed by two adjacent ones of the friction members; the paired friction members are together provided with a one-piece metallic backing secured to the back surfaces thereof while they are each separately provided with a spring member; and the friction members are mounted, on the back surface side, via the separately provided spring members, to a base plate by means of rivets. This is because by being mounted via the separately provided spring members to a base plate by means of rivets, the friction members are made to be individually movable. Furthermore, because of the one-piece metallic backing secured to the back surfaces of the paired friction members, a coupling is formed between the paired friction members through the metallic backing so that their movements are constrained to the extent minimally required.

(c) Moreover, if the configuration of the above (b) is employed, each friction member is fastened, substantially by two rivets, to the base plate. As such, they are not caused to rotate at their respective positions during the braking operation and thus the occurrence of loosening at fastening portions between the friction members and the base plate can be prevented. Even if one of the fastening portions is broken, the friction member does not fall off at once.

The present invention has been accomplished based on the above findings (a) to (c), and the summaries thereof are set forth below relating to a brake lining for railway vehicles in below (I) and a disc brake for railway vehicle in below (II).

(I) There is provided a brake lining configured to be pressed, by a brake caliper, against a frictional surface of a brake disc fixed to a wheel or an axle of a railway vehicle, the brake lining including:

a plurality of friction members arranged to be spaced from each other, each of the friction members having a front surface that faces the frictional surface of the brake disc;

a metallic backing secured to back surfaces of the friction members; and a base plate supporting the friction members at central portions thereof on the back surface side via spring members, the base plate being mounted to the brake caliper;

wherein the friction members are provided in pairs with each pair being formed by two adjacent ones of the friction members, and the metallic backing is a one-piece member provided for each pair of the friction members.

In the brake lining of the above (I), the metallic backing has a portion corresponding to a gap between the friction members fixed to the metallic backing and the portion is preferably a narrowed portion. In this case, the narrowed portion of the metallic backing preferably has a minimum width ranging from one third to two thirds of a maximum width of the friction member fixed to the metallic backing.

Furthermore, in the brake lining of the above (I), the metallic backing has a portion corresponding to a gap between the friction members fixed to the metallic backing and the portion preferably has a minimum length ranging from 2 to 7 mm.

(II) There is provided a disc brake for railway vehicles including:

a brake disc fixed to a wheel or an axle of a railway vehicle; and a brake caliper equipped with any one of the above brake linings.

ADVANTAGEOUS EFFECTS OF INVENTION

With the brake lining and the disc brake for railway vehicles of the present invention, it is possible to achieve uniform contact pressure between the brake lining and the brake disc during braking operation while at the same time achieving a stable coefficient of friction between them so that durability and reliability are enhanced. This is made possible by providing a configuration in which: the friction members are provided in pairs with each pair being formed by two adjacent ones of the friction members; the paired friction members are together provided with a one-piece metallic backing secured to the back surfaces thereof while they are each separately provided with a spring member; and the friction members are mounted, on the back surface side, via the separately provided spring members, to a base plate by means of rivets.

BRIEF DESCRIPTION OF DRAWINGS

FIG. 1(a) is a planar view of the brake lining, and FIG. 1(b) is an enlarged cross sectional view of FIG. 1(a) taken along line A-A.

FIG. 2(a) is a planar view of the brake lining, FIG. 2(b) is an enlarged plan view of a pair of friction members, and FIG. 2(c) is an enlarged cross sectional view of FIG. 2(a) taken along line B-B.

DESCRIPTION OF EMBODIMENTS

Hereinafter, embodiments of the brake lining and the disc brake for railway vehicles of the present invention are described in greater detail.

Figure 2:
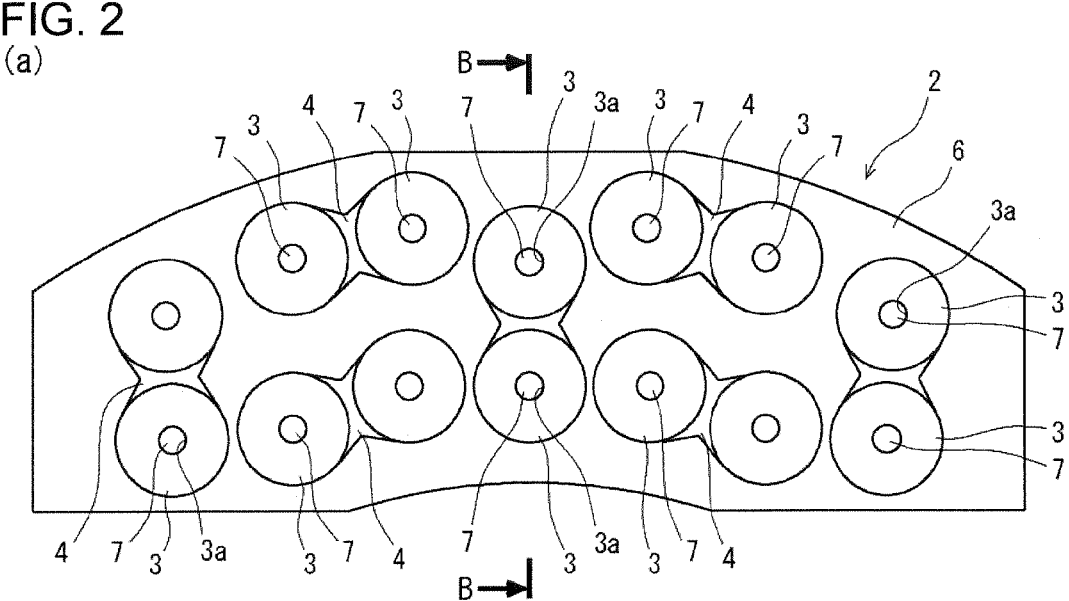
FIG. 2 shows an example of the disc brake for railway vehicles of the present invention. In the figure.
Figure 2:
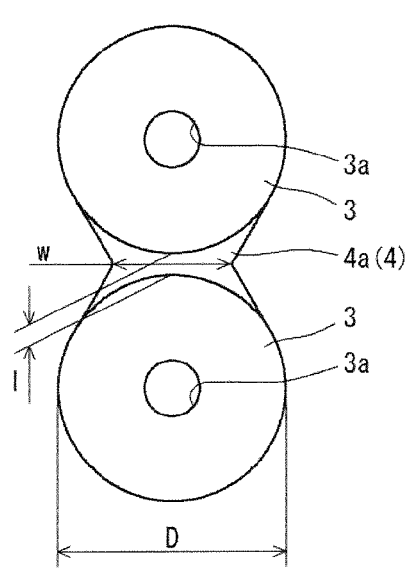
Figure 2:
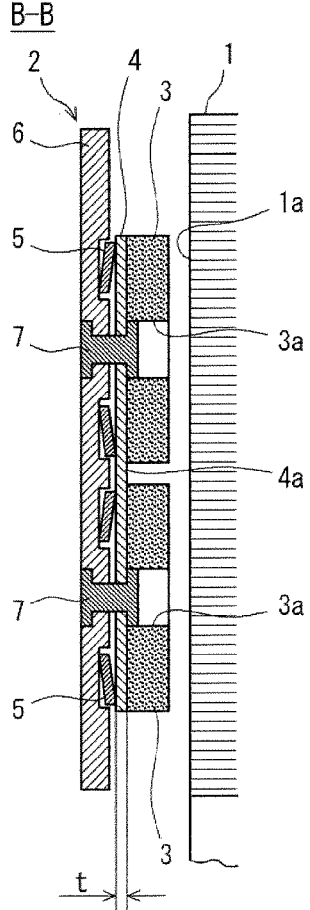

FIG. 2 shows an example of the disc brake for railway vehicles of the present invention. In the figure, FIG. 2(a) is a planar view of a brake lining, FIG. 2(b) is an enlarged plan view of a pair of friction members, and FIG. 2(c) is an enlarged cross sectional view of FIG. 2(a) taken along line B-B. FIG. 2(a) and FIG. 2(b) show the brake lining and the pair of friction members, respectively, as seen from the brake disc side, which is the front side.

As shown in FIG. 2(c), the disc brake of the present invention includes a brake disc 1, a brake lining 2, and a brake caliper (not shown) equipped with the brake lining 2. The brake disc 1 is in the form of a donut-shaped disc, and is mounted to the wheel or the axle (not shown) by means such as a bolt to be rigidly fixed thereto. The brake caliper is activated when braking is actuated to press the brake lining 2 against a frictional surface 1a of the brake disc 1. This causes friction between the brake disc 1 and the brake lining 2 due to sliding contact, and thus produces a braking force. In this manner, the disc brake slows or stops the rotation of the wheel or the axle to thereby control the speed of the vehicle.

The brake lining 2 of the present invention as shown in FIG. 2 includes a plurality of friction members 3, a metallic backing 4, spring members 5, and a base plate 6 holding all of these. The friction members 3 each have a front surface that faces the frictional surface 1a of the brake disc 1, and they are arranged to be spaced from each other. As shown in FIG. 2(a), for example, it is possible to adopt an embodiment in which a total of fourteen friction members are arranged, with two in each radial direction of the brake disc 1 and seven in each circumferential direction of the brake disc 1. The arrangement and number of the friction members 3 are not particularly limited.

Figure 1:
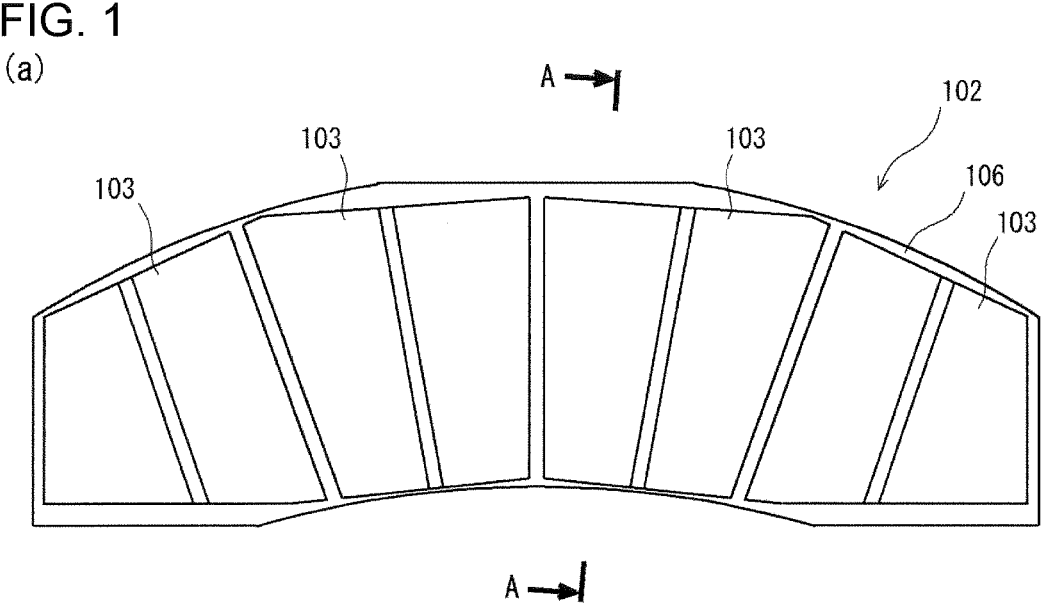
FIG. 1 shows a conventional typical disc brake for railway vehicles. In the figure.
Figure 1:
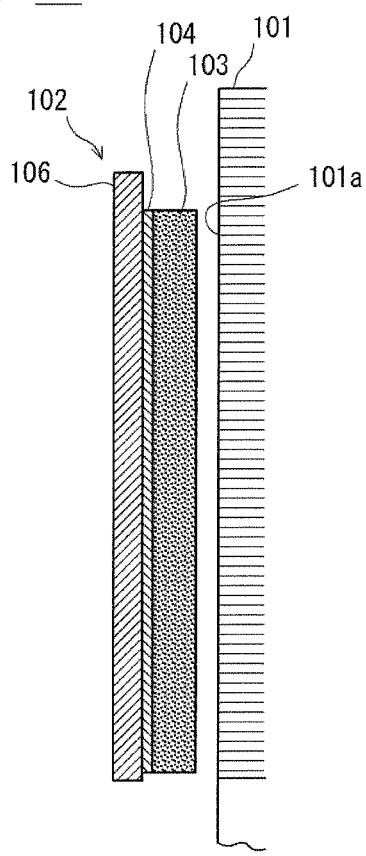

The friction members 3 are made of a sintered copper material, a resin-based material, or the like. Each of them is in such a form as a small piece which may be obtained by dividing the wide plate-shaped friction member 103 of the conventional brake lining 102 as shown in FIG. 1. As shown in FIGS. 2(a) and 2(b), the friction members 3 are circular in plan view, and has a small hole 3a in its center. A rivet 7 is inserted through the small hole 3a when the friction member 3 is mounted to the base plate 6. The plan shape of the friction member 3 is not limited to circular, but may be polygonal such as quadrilateral or hexagonal.

The friction members 3 are provided, on the back surface thereof, with a metallic backing 4 made of a thin metallic plate such as a steel plate so that their strength and rigidity are maintained. The metallic backing 4 is a one-piece member to be provided for each pair of two adjacent friction members 3 to hold the paired friction members 3 together. By virtue of this, the paired friction members 3 are coupled to each other by means of the metallic backing 4. The paired friction members 3, which are coupled by the metallic backing 4, may be in adjacent relation in any direction without limitation. They may be adjacent to each other in radial directions of the brake disc 1, in circumferential directions thereof, or in any other directions.

The friction members 3, together with the metallic backings 4, are mounted to the base plate 6 by means of the rivet 7 inserted through the small hole 3a in the center of the friction member 3. It is to be noted that the friction members 3 are each separately provided with a spring member 5 disposed between the metallic backing 4 and the base plate 6 on the back surface side, whereby the friction members 3 are each separately resiliently supported. As an example of the spring member 5, a disc spring is illustrated in FIG. 2, but instead a leaf spring, a coil spring, or the like may be employed.

In the disc brake equipped with the thus configured brake lining 2, the friction members 3 are mounted, via the separately provided spring members 5, to the base plate 6 by means of the rivet 7, so that they are each separately resiliently supported. This allows the friction members 3 to be individually movable. By virtue of this, it is possible to achieve uniform contact pressure between the brake lining 2 and the brake disc 1 during the braking operation.

In addition, since the paired friction members 3 are together provided with the one-piece metallic backing 4 secured to the back surfaces thereof, a coupling is formed between the paired friction members 3 through the metallic backing 4. Because of this, their movements are constrained to the extent minimally required compared to the case where they are not coupled by means of the metallic backing. By virtue of this, it is possible to achieve a stable coefficient of friction between the brake disc 1 and the brake lining 2 regardless of the traveling speed at the time of start of the braking operation.

Moreover, the friction members 3 are each fastened, substantially by two rivets 7, to the base plate 6, so that they are not caused to rotate at their respective positions during the braking operation. Thus, it is possible to prevent loosening at the fastening portions of the friction members 3 and the base plate 6. Even if loosening occurs at a fastening portion, the friction member 3 does not fall off at once unless the two fastening portions are broken at the same time. It is therefore possible to ensure sufficient durability and reliability.

As a matter of fact, the friction members 3 are each resiliently supported at the position of the rivet 7 immediately beneath their center serving as a supporting point, and therefore they are not tilted to a great extent even if they come into contact with the brake disc 1 and are caused to move during the braking operation. Thus, the wear of the contact surface occurs uniformly over the entire area, so that no partial wear results.

In such a brake lining 2 of the present invention as shown in FIGS. 2(a) and 2(b), the metallic backing 4 has a portion 4a corresponding to the gap between the paired friction members 3 fixed to the metallic backing 4, i.e., a coupling portion 4a of the friction members 3, and this portion is preferably narrowed. This is because it is advantageous in terms of weight saving. In this case, the metallic backing 4 is preferably configured such that the coupling portion 4a (narrowed portion) has a minimum width w ranging from one third to two thirds of a maximum width D of the friction member 3 fixed to the metallic backing 4 and has a thickness t (see FIG. 2(c) ranging from 1.5 to 4 mm. This is because a uniform contact area and a stable coefficient of friction as mentioned above can be achieved effectively. It is noted that the maximum width D of the friction member 3 as referred to herein means a maximum width of the friction member 3 in the direction parallel to the minimum width w of the coupling portion 4a.

Furthermore, in the brake lining 2 of the present invention as shown in FIGS. 2(a) and 2(b), the metallic backing 4 is preferably configured such that the coupling portion 4a has a minimum length 1, i.e., a minimum gap between the friction members 3, ranging from 2 to 7 mm, and more preferably ranging from 3 to 5 mm. If the minimum length 1 of the coupling portion 4a is too short, the movement of the friction members 3 is excessively constrained, and this makes it difficult to achieve a uniform contact area as mentioned above. On the contrary, if it is too long, the movement of the friction members 3 is not adequately constrained, and this makes it difficult to achieve a stable coefficient of friction as mentioned above.

It is noted that the spring constant of the spring member 5 for resiliently supporting the friction members 3 to allow them to move is preferably in a range from about 4 to about 10 kN/mm for practical purposes.

EXAMPLES

To verify the advantageous effects of the present invention, Finite Element Method (FEM) analysis and brake tests were conducted as described below.

[Summary of the Analysis and Tests]

An FEM analysis was conducted to evaluate the uniformity of contact pressure between a brake lining and a brake disc during braking operation. In the analysis, the brake lining and the brake disc were modeled as elastic bodies, and a load corresponding to the pressing force by the brake caliper was applied from the back side of the brake lining. In this analysis, the loads acting on the individual friction members were evaluated.

Brake tests were conducted primarily to evaluate the stability of the coefficient of friction between the brake disc and the brake lining during braking operation. In the tests, a wheel to which the brake disc was mounted was caused to rotate at its position, and the brake lining mounted to the brake caliper was pressed against the brake disc for braking. In these tests, the coefficients of friction were found from the pressing loads acting on the brake lining and measured braking torque.

Both the FEM analysis and the brake tests were directed to evaluation of disc brakes for use in bullet trains.

[Analysis and Test Conditions]

Principal conditions for the FEM analysis and the brake tests are summarized in Table 1 below.

TABLE 1

| Classification | Coupling of Friction Members by Metallic backing | Minimum Length of Coupling Portion | Disc Spring | Number of Friction Members | Brake Test | FEM Analysis |
|---|---|---|---|---|---|---|
| Inventive Example 1 | Present | 2 [mm] | Present | 14 | Conducted | Conducted |
| Inventive Example 2 | Present | 3 [mm] | Present | 14 | Not Conducted | Conducted |
| Inventive Example 3 | Present | 5 [mm] | Present | 14 | Not Conducted | Conducted |
| Comparative Example 1 | Absent | — | Present | 14 | Conducted | Conducted |
| Comparative Example 2 | Absent | — | Absent | 4 | Not Conducted | Conducted |

In the FEM analysis, the disc brake shown in FIG. 2 was employed and the analysis was carried out under three conditions of Inventive Examples 1 to 3. In all the inventive examples, the thickness of the metallic backing was 2.3 mm, and the minimum width of the coupling portion of the metallic backing that couples the paired friction members was 21 mm. The minimum length of the coupling portion that couples the paired friction members was varied among Inventive Example 1, Inventive Example 2, and Inventive Example 3, each configured to have a minimum length of 2 mm, 3 mm, and 5 mm, respectively.

Furthermore, in Inventive Examples 1 to 3 all in common, the longitudinal length of the base plate (the length in the direction corresponding to the circumferential direction of the brake disc) was 400 mm, the widthwise length thereof (the length in the direction corresponding to the radial direction of the brake disc) was 130 mm. With regard to the materials that form the brake lining, the friction members were made from a sintered copper material, and all the other parts were made from a steel material. The number of the friction members was fourteen, and each of them was circular in plan view with a diameter of 45 mm. The spring constant of the disc spring arranged between the friction members and the base plate was set to 7 kN/mm. The brake disc was generally in the form of a disc with an inner diameter of 476 mm and an outer diameter of 724 mm, and the radial length of the frictional surface thereof that comes into contact with the brake lining was 120 mm.

The FEM analysis was conducted under the conditions: a pressing force of 14 kN; and a coefficient of friction at the contact surface between the brake disc and the brake lining of 0.3.

For the sake of comparison, a further FEM analysis was conducted under two conditions of Comparative Examples 1 and 2. In Comparative Example 1, among the conditions of Inventive Example 1, the coupling of the paired friction members by the metallic backing was not employed. Instead, Comparative Example 1 employed a disc brake in which the friction members are each separately provided with a metallic backing secured to the back surface thereof (the type of disc brake described in PATENT LITERATURE 1). In Comparative Example 2, the conventional disc brake shown in FIG. 1 was employed.

In the meantime, the brake tests were conducted under two conditions, i.e., the conditions of Inventive Example 1 and the conditions of Comparative Example 1. The tests were conducted by specifying eight different speeds in the range of 30 to 330 km/h as the initial speed, assuming that emergency braking was applied from the respective initial speeds.

[Evaluation Method]

An object of the present invention resides in providing a uniform contact area while at the same time providing a stable coefficient of friction, and further in ensuring durability of the disc brake. In the brake tests, in order to evaluate the stability of the coefficient of friction and durability, investigations were made to find, as corresponding indices, variations in the coefficient of friction as well as whether or not the individual friction members were caused to rotate at their respective positions. Herein, from the mean coefficients of friction obtained in the brake tests performed from the initial speeds, the maximum and minimum values were extracted and the differences between them were determined to be the variations of the coefficient of friction.

On the other hand, in the FEM analysis, in order to evaluate the uniformity of the contact area, variations in the loads acting on the individual friction members were investigated as a corresponding index. Herein, from the loads acting on the friction members when the pressing force was applied, the maximum and minimum values were extracted and the differences between them were determined to be the variations in the loads.

[Results]

The results of the FEM analysis and the brake tests are summarized in Table 2 below.

TABLE 2

| | Brake Test | | |
| --- | --- | --- | --- |
| Classification | Variation in Coefficient of Friction | Number of Friction Members Rotated | FEM Analysis Variation in Load |
| Inventive Example 1 | 0.035 | 0 | 535 [N] |
| Inventive Example 2 | — | — | 417 [N] |
| Inventive Example 3 | — | — | 391 [N] |
| Comparative Example 1 | 0.065 | 4 | 439 [N] |
| Comparative Example 2 | — | — | 4425 [N] |

From the results shown in the table, it is found that in Inventive Example 1, in which the paired friction members are coupled by the metallic backing, the variations in the coefficient of friction are small and no rotation of the friction members occur. It is also found that in Inventive Examples 1 to 3, the variations in the loads are reduced because of the effect of the resilient support of the friction members by the disc spring. From the above findings, it is clear that the disc brake equipped with the brake lining of the present invention is capable of providing a uniform contact area while at the same time providing a stable coefficient of friction, and further capable of ensuring durability.

In contrast, it is found that in Comparative Example 1, in which the paired friction members are not coupled by the metallic backing, the variations in the coefficient of friction are relatively large and rotation occur in several friction members. Furthermore, it is found that in Comparative Example 2, the variations in the loads are large because the conventional brake lining was used.

INDUSTRIAL APPLICABILITY

The brake lining and the disc brake for railway vehicles of the present invention can be utilized effectively in a variety of railway vehicles, and in particular are useful in high speed railway vehicles that travel over a broad range of speed from low speed to high speed.

REFERENCE SIGNS LIST

1: brake disc, 1*a*: frictional surface,
2: brake lining, 3: friction member, 3*a*: small hole,
4: metallic backing, 4*a*: coupling portion, 5: spring member,
6: base plate, 7: rivet

What is claimed is:

1. A brake lining configured to be pressed, by a brake caliper, against a frictional surface of a brake disc fixed to a wheel or an axle of a railway vehicle, the brake lining comprising:
a plurality of friction members arranged to be spaced from each other, each of the friction members having a front surface that faces the frictional surface of the brake disc and a central portion;
a metallic backing secured to back surfaces of the friction members;
a base plate supporting the friction members on back surfaces thereof using a plurality of fixing members, wherein each central portion of each friction member is fixed to the base plate using one of the fixing members, the plurality of friction members being fixed to the base plate at different portions thereof from each other, the base plate being mounted to the brake caliper; and
spring members provided between the base plate and the metallic backing;
wherein the friction members are provided in pairs with each pair being formed by two adjacent ones of the friction members, and the metallic backing is a one-piece member provided for each pair of the friction members.

2. The brake lining for railway vehicles according to claim 1, wherein the metallic backing has a portion corresponding to a gap between the friction members fixed to the metallic backing and the portion is a narrowed portion.

3. The brake lining for railway vehicles according to claim 2, wherein the narrowed portion of the metallic backing has a minimum width ranging from one third to two thirds of a maximum width of the friction members fixed to the metallic backing.

4. The brake lining for railway vehicles according to claim 1, wherein the metallic backing has a portion corresponding to a gap between the friction members fixed to the metallic backing and the portion has a minimum length ranging from 2 to 7 mm.

5. The brake lining for railway vehicles according to claim 2, wherein the metallic backing has a portion corresponding to a gap between the friction members fixed to the metallic backing and the portion has a minimum length ranging from 2 to 7 mm.

6. The brake lining for railway vehicles according to claim 3, wherein the metallic backing has a portion corresponding to a gap between the friction members fixed to the metallic backing and the portion has a minimum length ranging from 2 to 7 mm.

7. A disc brake for railway vehicles comprising:
a brake disc fixed to a wheel or an axle of a railway vehicle; and
a brake caliper equipped with the brake lining according to claim 1.

8. A disc brake for railway vehicles comprising:
a brake disc fixed to a wheel or an axle of a railway vehicle; and
a brake caliper equipped with the brake lining according to claim 2.

9. A disc brake for railway vehicles comprising:
a brake disc fixed to a wheel or an axle of a railway vehicle; and
a brake caliper equipped with the brake lining according to claim 3.

10. A disc brake for railway vehicles comprising:
a brake disc fixed to a wheel or an axle of a railway vehicle; and
a brake caliper equipped with the brake lining according to claim 4.

11. A disc brake for railway vehicles comprising:
a brake disc fixed to a wheel or an axle of a railway vehicle; and
a brake caliper equipped with the brake lining according to claim 5.

12. A disc brake for railway vehicles comprising:
a brake disc fixed to a wheel or an axle of a railway vehicle; and
a brake caliper equipped with the brake lining according to claim 6.

* * * * *